May 8, 1934. C. G. STRANDLUND 1,957,738
LISTER
Filed May 19, 1930 3 Sheets-Sheet 1
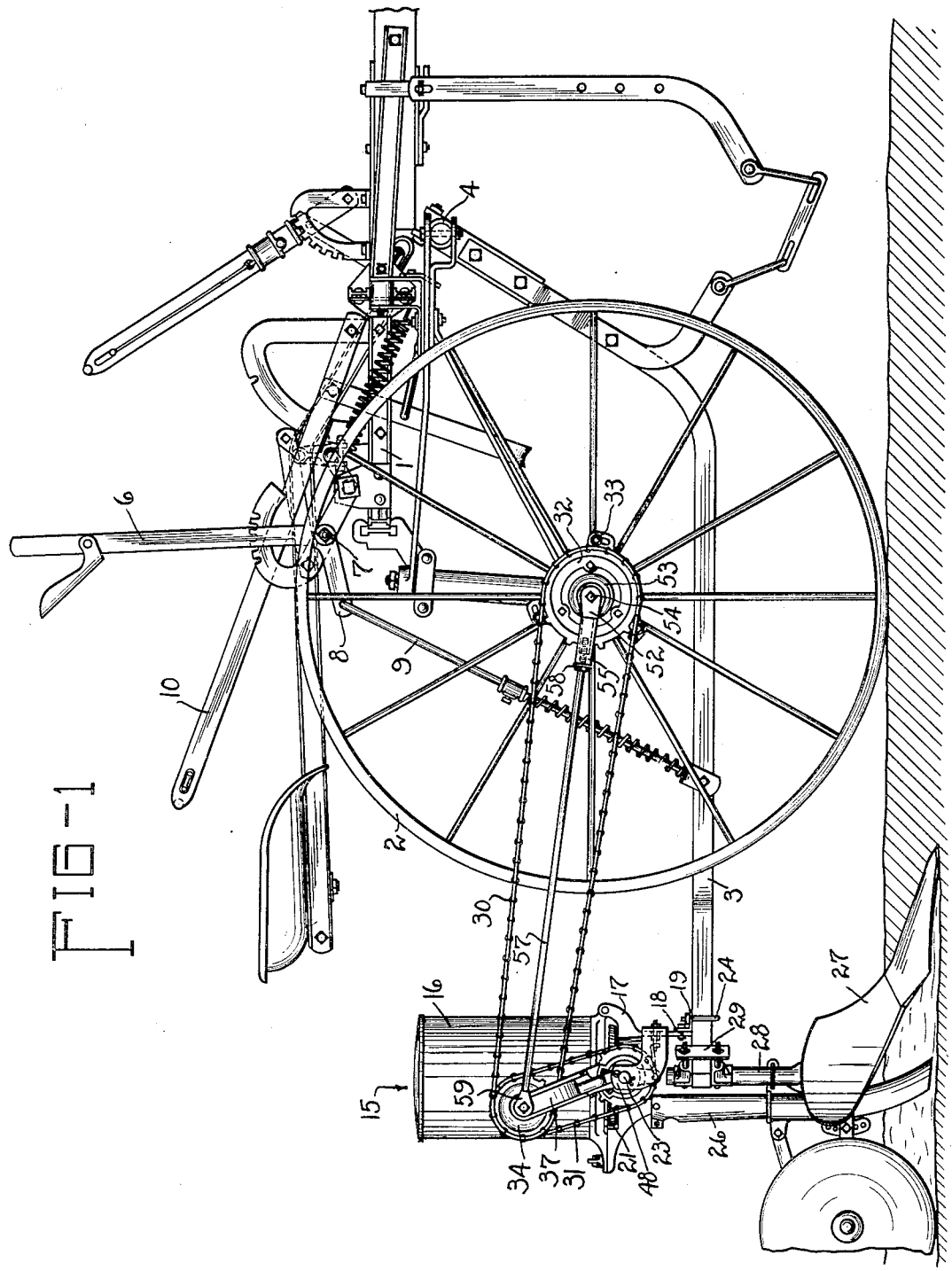

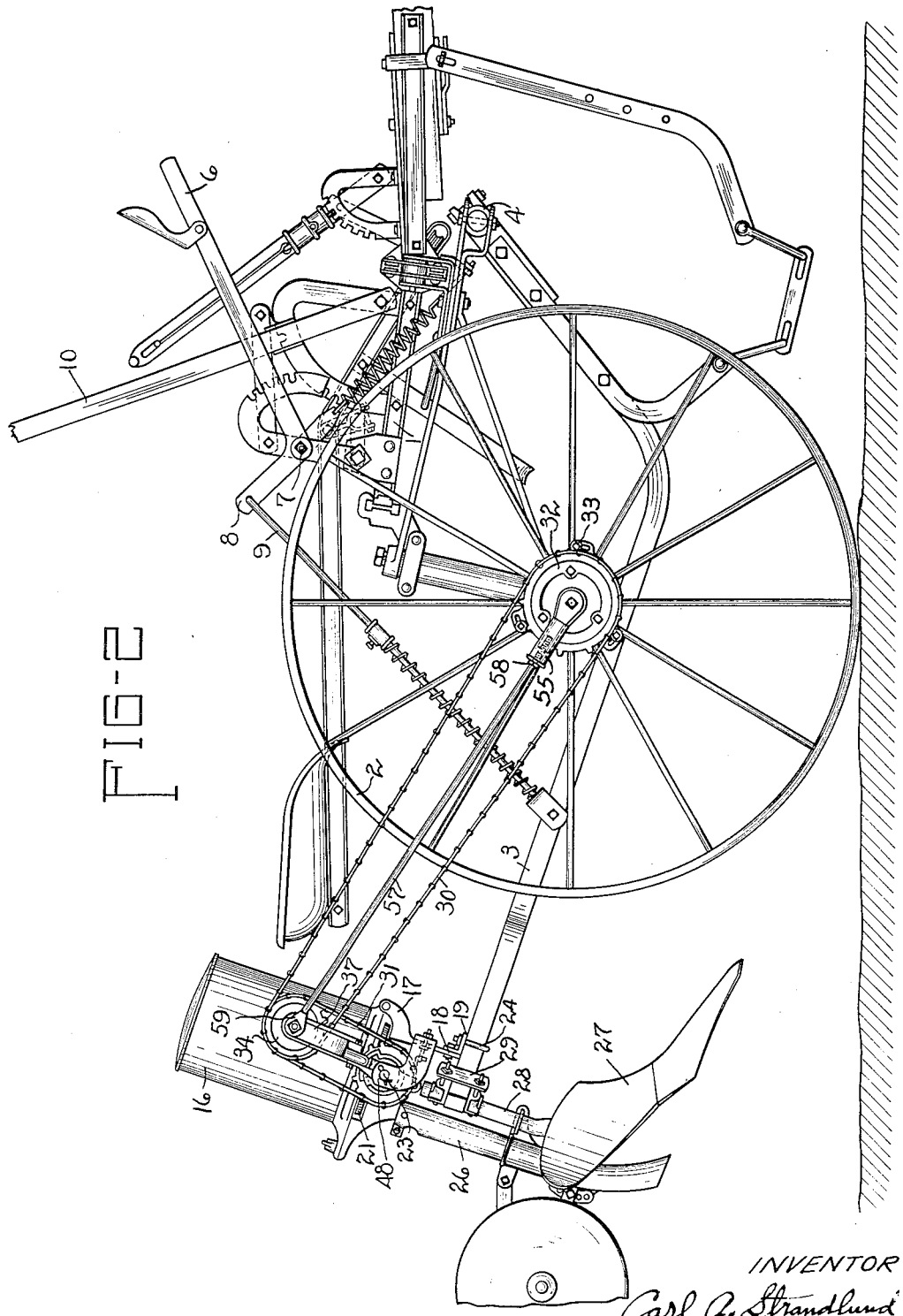

May 8, 1934.  C. G. STRANDLUND  1,957,738
LISTER
Filed May 19, 1930  3 Sheets-Sheet 3
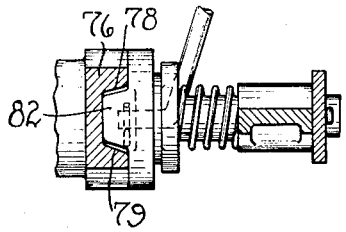
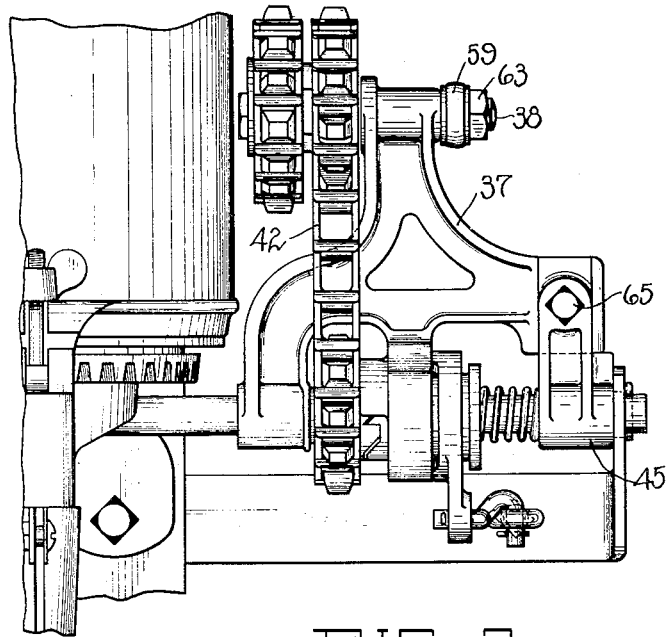
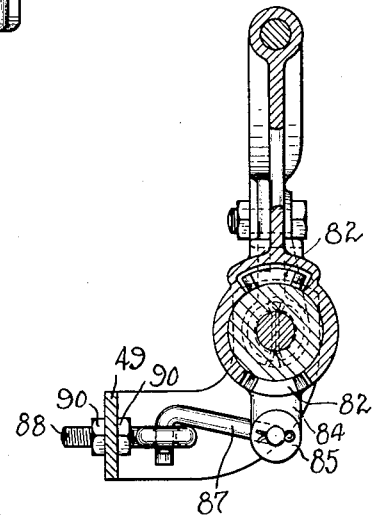
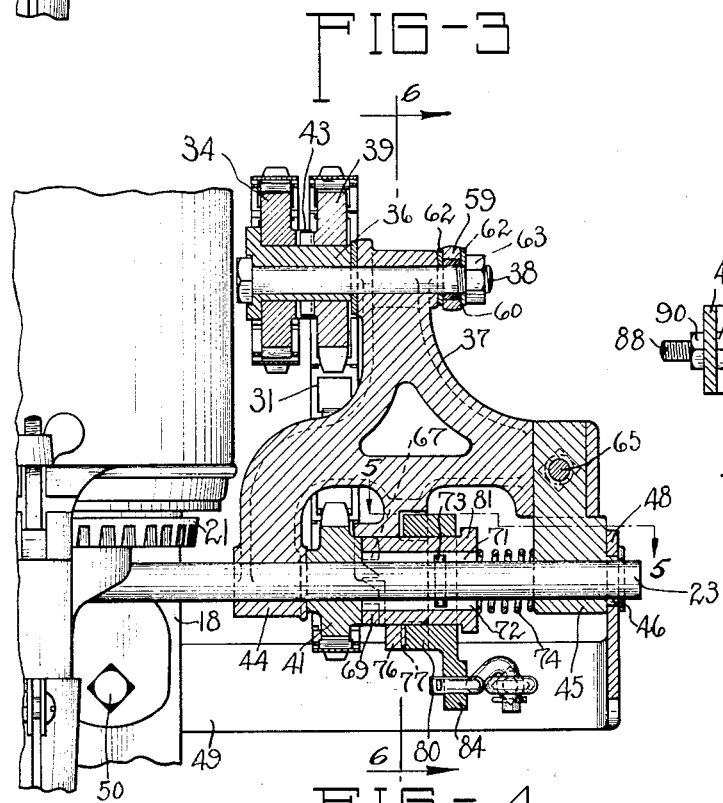
INVENTOR
Carl G. Strandlund
BY Brown, Jackson, Boettcher & Dienner
ATTORNEYS
WITNESS
Walter Ackerman Patented May 8, 1934

1,957,738

UNITED STATES PATENT OFFICE 1,957,738

LISTER

Carl G. Strandlund, Moline, Ill., assignor to Deere & Company, Moline, Ill., a corporation of Illinois Application May 19, 1930, Serial No. 453,804

33 Claims. (Cl. 111—67)

My present invention relates generally to agricultural implements and particularly to a type of implement commonly known as a lister where one or more furrow openers are mounted on a wheeled frame and which are operated in conjunction with seed depositing mechanism which may be driven by one of the supporting wheels or other means on the wheeled frame.

More specifically, my invention is concerned with the provision of an improved form of driving connection between the driving means for the lister and the seed selecting or planting mechanism which is so constructed and arranged that the drive is automatically interrupted when the seed planting mechanism and furrow openers therefor are raised to inoperative position.

One object of my invention is, therefore, the provision of improved means for stopping and starting the seed depositing mechanism by the raising and lowering of the furrow openers. Another object of my invention is the provision of improved means for maintaining the driving chains taut and for adjusting the same, which means is so constructed and arranged that the driving connections to the seed depositing mechanism are not effected by various vertical positions of the seed depositing mechanism. A still further object of my invention is the provision of an improved form of driving connection where a portion of the same is connected to move about the driving means on the same frame as a center and which part is also adapted to move about a portion of the seed depositing mechanism as a center, thus providing a flexible drive the parts of which are always maintained in fixed spaced relation with one another, one of which parts is adapted to be moved angularly when the seed depositing mechanism is raised and lowered, there being a clutch connected with this angularly movable part so that when the seed planting mechanism is elevated the clutch is automatically disconnected, and vice versa.

Still further, another object of my invention is the provision of a simplified and improved means for maintaining the driving chains taut.

Other objects and advantages of my invention will be apparent to those skilled in the art after a consideration of the following detailed description of one embodiment illustrated in the accompanying drawings.

In the drawings:—

Figure 1 is a side elevation of my improved lister;

Figure 2 is a side elevation corresponding to the machine illustrated in Figure 1, but with the seed depositing mechanism and furrow openers raised to inoperative position;

Figure 3 is an enlarged fragmentary view showing the driving connection through the transversely extending shaft feeding mechanism;

Figure 4 is a sectional view corresponding to the view shown in Figure 3;

Figure 5 is a cross sectional view taken substantially along the line 5—5 of Figure 4; and Figure 6 is a cross sectional view taken substantially along the line 6—6 of Figure 4.

Referring now to the drawings, the reference numeral 1 indicates a main or supporting frame having supporting wheels 2 and rearwardly extending tool means 3 pivoted to the main or supporting frame 1 for up and down swinging in a vertical plane and about a transverse axis indicated by the reference numeral 4 which is spaced from the axis of the supporting wheels 2. A hand lever 6 is pivoted to the main frame 1, as at 7 in Figure 1, and the lever 6 has extending rearwardly therefrom an arm 8 which is connected by means of a rod 9 to the tool beam 3.

As shown in Figures 1 and 2 the structure just described may take the form of the ordinary cultivator having a pair of tool beams, such as 3, each with its hand lever 6 for raising and lowering the same. When my improved lister is arranged to include portions of the usual cultivator, the master lever 10 may be employed to raise and lower both of the beams 3 simultaneously.

Seed depositing mechanism, indicated generally by the reference numeral 15, is mounted on the rear ends of the fore and aft extending beams 3 and includes a seed hopper 16 mounted adjacent each beam 3 and secured thereto by means of a casting 17 bolted or otherwise secured to a plate 18 which, in turn, is secured to a transversely extending beam 19 which is securely clamped to each of the tool beams 3. Preferably, a hopper 16 is mounted adjacent each end of the transversely extending beam 19. Both hoppers include the usual seed selecting mechanism, a portion of which is indicated by the reference numeral 21, and a transversely extending shaft 23 is journaled at its ends in each of the castings 17 and connected to simultaneously drive each of the seed selecting mechanisms 21 whereby seeds are taken from the hoppers 16 and deposited in or upon the ground, as is well understood in the art. Preferably, the transversely extending beam 19 is secured to the tool beams 3 by means of U-shaped clamps 24, best shown in Figures 1 and 2.

The seed hoppers 16 and selecting mechanism 21 deposit seed into a boot 26 which extends downwardly from each hopper 16 and directs the seed in the furrows formed by the furrow openers 27. The furrow openers 27 are each secured to one of the tool beams 3 by means of a vertical pipe 28 clamped to the beams 3 by means of clamps 29.

The seeding mechanisms 21 and the shaft 23 are driven from power derived from one of the supporting wheels 2 through driving chains 30 and 31. The driving chain 30 is trained over a removable gear member or sprocket wheel 32 bolted to the outside of wheel 2 by means of bolts 33. The rear bight of the chain 30 is trained over a sprocket 34 which is journaled on a sleeve or bushing 36 bolted to the upper end of the bracket 37 by means of a bolt 38, as best shown in Figure 4. A second sprocket 39 is journaled on the bushing 36 coaxially with the sprocket 34, and the sprocket chain 31 is trained over sprocket 39 and a sprocket 41 journaled on the shaft 23.

As shown in Figure 4, the sprockets 34 and 39 are provided with cooperating clutch teeth 43 by which the drive is transmitted from one to another. The sprockets 34 and 39 are preferably although not necessarily formed as separate members, as shown in Figure 4. I prefer the construction shown.

The bracket 37 is forked at its lower end, the forked ends terminating in two bearings 44 and 45 in which is received one end of the transverse shaft 23 whereby the bracket 37 is journaled thereon. The bearing member 45 is provided with a reduced portion 46, best shown in Figure 4, which is received in a perforation formed in the upturned end 48 of the laterally extending bracket 49 bolted to the plate 18, as by a bolt 50, which thereby serves as means for partially supporting the weight of the bracket 37 and associated structure.

A casting 52 is pivotally mounted on the end of the hub cap 53 of the right hand supporting wheel 2, as by means of a bolt and nut 54. The hub cap 53 may be connected with the main frame 1 through the spindle and axle for the right hand supporting wheel 2. The casting 52 has a rearwardly extending arm 55 provided with an internal bore in which is threadedly received the chain tightening rod or link 57, which latter is adjustably held in any position of adjustment therein by means of the nut 58. At its rear end the rod or link 57 is flattened, as at 59, and which is perforated and embraces the outer end of the bolt 38, as shown in Figures 3 and 4. A sleeve 60 is interposed between the flattened end 59 and the bolt 38 and is clamped between washers 62. The sleeve 60 is of such length that the bushing 36 may be drawn up tight by drawing up on the nut 63 while permitting freedom of pivotal movement of the rod 57 with respect thereto.

For assembly purposes, the bearing member 45 may be made removable from the bracket 37 and adapted to be held to the bracket 37 by means of a bolt 65.

The hub of the sprocket 41 is provided with clutch teeth 67, as best shown in Figure 4, which are adapted to engage companion clutch jaws or teeth 68 on the inner end of a shiftable clutch sleeve 69. The sleeve 69 is slidable but non-rotatable on the shaft 23 and for this purpose the sleeve 69 is provided with two key ways 71 and 72 in which project the opposite ends of a pin or key 73. Thus the clutch sleeve is free to slide along the shaft 23 to engage with or be disengaged from the teeth formed on the sprocket 41 journaled on the shaft 23. A spring 74 normally holds the sleeve 69 in engagement with the sprocket 41, the spring 74 being interposed between the end of the sleeve 69 and the adjacent face of the bearing member 45, as best shown in Figure 4.

The bracket 37 is provided with an intermediate arm 76 which extends downwardly and is apertured to receive and embrace the sleeve 69. The arm 76 is provided with upper and lower recesses 77 having beveled sides 78 and 79 as best shown in Figure 5. A ring 80 also embraces the sleeve 69 and is positioned between the recesses 77 and a flange 81 formed on the end of the sleeve 69. The ring 80 is provided with lugs 82 normally engaging in the recesses 77 and having the sides thereof correspondingly beveled so that relative rotation of the ring 80 and the arm 76 will cause the ring 80 to be moved to the right, as viewed in Figures 4 and 5, thereby engaging the flange 81 and moving the clutch sleeve 69 out of driving engagement with the sprocket 41.

The ring 80 is provided with a downwardly depending lug 84 having an apertured boss 85 which receives one end of a link 87, the other end of the link being connected by means of an eye bolt 88 secured to the laterally extending bracket 49, as best shown in Figure 6. The eye bolt 88 may be adjusted with respect to the bracket 49 by backing off one of the bolts 90 and tightening up the other.

Through the link connection 87 the ring 80 is held in a fixed relation with respect to the beams 3, the bracket 49 and seeding mechanisms 21, so that when the bracket 37 is rocked about its journal support on the shaft 23, the sleeve 69 will be moved along the shaft 23, by virtue of the beveled lugs or cams, thereby connecting and disconnecting the clutch teeth 67 and 68.

Figures 3 to 6, inclusive, show the position of the parts when the lister is in operative position, that is, when the tools 27 are in furrow opening position, as shown in Figure 1. When the beams 3 are raised the lister is elevated to inoperative position as shown in Figure 2 and the seeding mechanisms are carried away from the axis of the supporting wheels 2 by virtue of the fact that the beams 3 are swung upwardly about an axis 4 which is at a distance from the axis of the supporting wheels 2, and upward movement of the seed depositing mechanism causes a clockwise rotation of the bracket 37 as viewed in Figure 1, the bracket 37 moving about the shaft 23 as a center. As the bracket 37 is thus rotated, the arm 76 carries the ring 80 outwardly, thereby moving the clutch sleeve 69 to the right as viewed in Figure 4, whereupon the teeth 67 and 68 are disengaged. The disengaging of the teeth 67 and 68 arrests the rotation of the seeding mechanism drive shaft 23.

By virtue of the link 57, the upper end of the bracket 37 is constrained to move about the pivotal axis of supporting wheels 2 as a center, thus the distance between the sprocket 34 and the sprocket or gear 32 does not vary notwithstanding the raising and lowering of the beams 3 and the seeding mechanisms carried thereby. This structure permits the sprocket 34 to be moved about the axis of the sprocket wheel 32 and the axis of the shaft 23, when the mechanism 21 is moved relative to the frame 1. Thus the sprocket 34 is mounted for epicyclic motion about the parts 32 and 23. Of course, since the bracket 37 rotates about the shaft 23, the sprocket 39 is always a fixed distance from the sprocket 41. Chains 30 and 31 are, however, subject to some wear and in order to compensate for such wear I provide means for individually adjusting these chains. By removing the rod or link 57 from the bolt 38 and loosening the nut 58, the rod of link 57 may be screwed outwardly of the arm 55, thereby increasing the distance between the sprocket 34 and the sprocket 32 so that when these parts are restored to the position shown in Figure 1, the chain is under the proper tension.

Referring, now, to Figure 4, it will be noted that the opening in the bushing or sleeve 36 which receives the bolt 38 is eccentric with respect to the axis of the bushing 36. By loosening the bolt 38 and rotating the sleeve or bushing 36 on the bolt 38, the tension of the chain 31 may be adjusted. In some cases this means may also be employed to tighten the chain 30 since rotating the bushing 36 also moves the sprocket 34 relative to the sprocket 32.

The operation of my improved lister is believed to be obvious from the above description. In operation the lister is arranged as shown in Figure 1, suitable draft means being applied to the wheeled frame 1, and when the end of the row is reached all the operator has to do is to raise the beams 3 by means of the levers 6 or 10, thereby raising the furrow openers 27 and the seeding mechanism to inoperative position. The raising of the seeding mechanism automatically swings the bracket 37 forwardly whereby the clutch teeth 67 and 68 are disconnected, thus interrupting the drive from the supporting wheel to the seeding shaft 23. When the implement is turned around and ready to plant again, all the operator has to do is to lower the beams 3 and the seeding mechanism to the position shown in Figure 1, the lowering process swinging the bracket 37 from the forwardly inclined position shown in Figure 2 to the rearwardly inclined position shown in Figure 1, thus rocking the arm 76 back to the position shown in Figure 5, whereupon the spring 74 moving the clutch sleeve 69 into engagement with the sprocket 41, as in Figure 4, restores the drive to start the planting operation.

While I have described in connection with the accompanying drawings one preferred embodiment of my invention, it is to be understood that my invention is not to be limited to the specific structure shown but that, in fact, widely different means may be employed in the practice of the broader aspects of my invention.

What I claim, therefore, and desire to secure by Letters Patent is:—

1. An agricultural implement comprising a frame having supporting wheels, a rotatable mechanism carried by the frame driving connections for said mechanism for driving the same from one of the supporting wheels, means for moving said mechanism toward and away from the axis of the driving wheel, and means responsive to the movement of said mechanism toward and from the axis of said driving wheel for interrupting and restoring operative relation of said driving connections.

2. An agricultural machine comprising, in combination, a frame having supporting wheels, seeding mechanism mounted on said frame and movable relative to the axis of said supporting wheels, means for raising and lowering said mechanism, a clutch, a rotatable bracket on the seeding mechanism for operating the clutch, and means actuated by the movement of the seeding mechanism relative to said wheel axis for rocking the bracket.

3. An agricultural machine comprising, in combination, a frame having supporting wheels, seeding mechanism mounted on said frame and movable relative to the axis of said supporting wheels as said mechanism is raised to inoperative position, means to raise and lower said mechanism, a clutch, a rotatable bracket on the seeding mechanism for operating the clutch, and means actuated by the movement of the seeding mechanism relative to said wheel axis for rocking the bracket when the seeding mechanism is raised and lowered.

4. An agricultural machine comprising, in combination, a frame having supporting wheels, seeding mechanism mounted on said frame and movable relative to the axis of said supporting wheels, a clutch, a rotatable bracket on the seeding mechanism for operating the clutch, and link means pivotally connected with the frame near the axis of said supporting wheels and with the bracket and operable to rock the bracket to shift the clutch when the seeding mechanism is moved relative to the axis of the supporting wheels.

5. An agricultural implement comprising in combination, seed depositing mechanism adapted to be raised and lowered to and from operating position, a wheeled frame, means pivotally connecting said mechanism to said frame, and at a distance from the axis of the supporting wheels, driving conections for driving the seed depositing mechanism including a clutch, a pivoted bracket mounted on the seeding mechanism and operatively connected with said clutch, and means movable radially about said wheel axis and actuated by raising and lowering the seeding mechanism for swinging the bracket to shift the clutch.

6. An agricultural machine comprising, in combination, a frame having supporting wheels, seeding mechanism mounted on said frame and movable relative to the axis of said supporting wheels, means pivotally connecting the seeding mechanism with the frame for movement in a vertical plane about a transverse axis, driving means for said mechanism including a part shiftable in a radial direction with respect to said axis, and means for moving the shiftable part including a member connected with the frame at a point spaced from said transverse axis.

7. An agricultural implement comprising a supporting frame, an operating mechanism carried thereby and movable relative thereto, said mechanism including a rotatable shaft and a clutch for driving the same, means carried by said mechanism and pivoted thereto for movement coaxially with respect to said shaft for operating the clutch, and means including a link for connecting the first mentioned means with the frame whereby relative movement of the operating mechanism actuates the clutch.

8. An agricultural implement comprising a supporting frame, supporting wheels journaled in said frame, an operating mechanism carried thereby and movable relative thereto, said mechanism including a rotatable shaft and a clutch for driving the same, and means for actuating the clutch including a member having a part movable about the axis of said shaft and a part movable about the axis of the supporting wheels.

9. An agricultural implement comprising a supporting frame, supporting wheels journaled on said frame, an operating mechanism carried thereby and movable relative thereto, said mechanism including a rotatable shaft and a clutch for driving the same, and means for actuating the clutch including a member having a part movable about the axis of said shaft and a part movable about the axis of the supporting wheels, and a link connecting the last mentioned part with the wheel axis whereby relative movement of the operating mechanism actuates the clutch.

10. An agricultural implement comprising a frame, an operating mechanism having a rotatable shaft and a ground engaging tool and movable relative to said frame to and from operative position, a sprocket journaled on the frame, a chain operating thereover, a second sprocket driven thereby, journal means for said second sprocket, a link connected to the last mentioned means at the axis of said second named sprocket and movable about the axis of the first named sprocket, said link being adjustable to accommodate said sprockets to the length of said chain, driving connections between the second named sprocket and said shaft and including a clutch, said journal means being mounted on the operating mechanism for movement about the axis of said shaft, and clutch operating means connected to the journal means whereby when the operating mechanism is moved relative to the frame and the journal means is rocked about the axis of the shaft the clutch will be actuated.

11. An agricultural implement comprising a frame, an operating mechanism having a rotatable shaft and a ground engaging tool and movable relative to said frame to and from operative position, driving connections for said shaft including a clutch, a rotatable member on the frame and a second rotatable member mounted for epicyclic motion about the axis of the first named rotatable member and the axis of the shaft when the operating mechanism is moved relative to the frame, and means operated by the epicyclic movement of the second rotatable member relative to the axis of the shaft for operating the clutch.

12. An agricultural implement comprising a frame, seed depositing mechanism movably carried thereby, means to move said mechanism to and from operating position, means for driving the seed depositing mechanism including a clutch, means for shifting said clutch comprising a pair of relatively movable members having cooperating cam surfaces, means connecting one of said members with said seed depositing mechanism for angular movement in response to movement of the mechanism, means for restraining the rotation of the other of said members but providing for its lateral movement whereby the clutch is actuated.

13. In an agricultural implement, the combination of a supporting frame, an operating mechanism including a shaft and pivotally connected with the frame, a rotatable sprocket member on the frame for driving said mechanism, a bracket on the operating mechanism, a journal mounted on the bracket, a double sprocket journaled on said bracket, a driven sprocket on said shaft, a chain connecting the double sprocket with said driving sprocket, a second chain connecting the double sprocket with the driven sprocket, and means to tighten said chains.

14. An agricultural implement comprising, in combination, a seeding mechanism including a rotatable shaft therefor, a frame for said mechanism, a main frame having an axle and supporting wheels journaled thereon, means pivotally connecting said frames together at a point spaced from the axis of the supporting wheels, a swinging bracket journaled on said shaft, a link pivotally connecting one end of the bracket to the wheel axle so that as the seeding mechanism frame is pivoted on the supporting frame the bracket will be rocked about its axis on the shaft, driving means for said shaft connected to one of said wheels and including a part rotatably mounted on said end of the bracket so as to swing in a circle about the wheel axle, clutch means operatively connecting the part to the shaft and means operable by rocking of the bracket on the shaft for actuating the clutch, and means to raise and lower the seeding mechanism frame.

15. An agricultural implement comprising, in combination, a seeding mechanism including a rotatable shaft therefor, a frame for said mechanism including a transverse beam, a main frame having supporting wheels, means pivotally connecting said frames together at a point spaced from the axis of the supporting wheels, a swinging bracket journaled on said shaft, a link pivotally connecting the upper end of the bracket with the main frame at the axis of the supporting wheels, one of which is provided with a sprocket, a second sprocket member journaled in the upper end of said swinging bracket and coincident with the axis of the pivotal connection between that end of the bracket and the link, a drive chain connecting said sprockets, said link being adjustable to tighten the chain, a third sprocket mounted on the shaft, a chain trained over the third sprocket and the second sprocket member, means to tighten the second chain, a clutch including a shiftable part for driving the shaft and means controlling the shiftable part comprising a cam member embracing the part and restrained from rotation relatively thereto, means on the swinging bracket having a cooperating cam surface and also embracing the clutch part, whereby when the swinging bracket is rocked by the pivotal movement of the seeding mechanism frame relative to the main frame the clutch part is shifted.

16. In combination, a frame, a driven mechanism including a shaft and a clutch and movably mounted with respect to said frame, means for driving said driven mechanism including a driving gear on the frame, a swinging support on said driven mechanism, and transmission means between the driving gear and said shaft, including a part journaled on said swinging support, said part being adapted to move about the axis of the driving gear as a center as the driven mechanism moves relative to the frame, and means actuated by the swinging support for operating the clutch.

17. In combination, a frame, a driven mechanism including a shaft and a clutch and movably mounted with respect to said frame, means for driving said driven mechanism including a driving gear on the frame, a swinging support on said driven mechanism mounted coaxially with respect to the shaft, and transmission means between the driving gear and said shaft including a part journaled on said swinging support, means causing the part to move about the axis of the driving gear as a center as the driven mechanism moves relative to the frame, said swinging support causing the part to move about the axis of the shaft, and means actuated by the swinging support for operating the clutch.

18. In combination, a frame, a driven mechanism including a shaft and a clutch and movably mounted with respect to said frame, means for driving said driven mechanism including a driving gear on the frame, a swinging support on said driven mechanism, and transmission means between the driving gear and said shaft, including a part journaled on said swinging support, means driving said part from the gear and means driving the shaft from said part, said part being adapted to move about the axis of the driving gear as a center and about the axis of the shaft as a center as the driven mechanism moves relative to the frame, and means actuated by the swinging support for operating the clutch.

19. In combination, a frame, a driven mechanism including a shaft and a clutch and movably mounted with respect to said frame, means for driving said driven mechanism including a driving gear on the frame, a swinging support on said driven mechanism, and transmission means between the driving gear and said shaft, including a part journaled on said swinging support, said part being adapted to move about the axis of the driving gear as a center as the driven mechanism moves relative to the frame, and cam means including a relatively movable part and a relatively stationary part for operating the clutch, the relatively movable part being connected to move with the swinging support.

20. An agricultural implement comprising the combination with a cultivator having supporting wheels and fore and aft extending tool beams, of a lister attachment including parts to be driven and removably secured to said beams, and a driving mechanism for said driven parts, said driving mechanism including a member removably secured to one of the supporting wheels.

21. An agricultural implement comprising the combination with a cultivator having supporting wheels and fore and aft extending tool beams, of a lister attachment having a rotatable mechanism removably secured to said beams and including a driving mechanism having a part removably secured to one of the supporting wheels, and means operated by the raising and lowering of the cultivator beams for interrupting and restoring operation of said driving mechanism.

22. A lister attachment adapted to be secured to the tool beams of a row cultivator and comprising a furrow opener removably secured to each of the beams, seed depositing mechanism including a transverse driven shaft and a transverse beam removably secured to the tool beams of the cultivator to connect them together in spaced apart relation, a driving gear removably secured to the outside of one of the cultivator wheels and driving means connecting the gear with the shaft.

23. A lister attachment adapted to be secured to the tool beams of a row cultivator and comprising furrow openers removably secured to the beams, seed depositing mechanism including a transverse driven shaft, a clutch therefor, and a transverse beam removably secured to the tool beams of the cultivator, a driving gear removably secured to one of the cultivator wheels, driving means connecting the gear with the shaft through said clutch, said tool beams being adapted to be raised and lowered, means for raising and lowering said tool beams, and means operable by the raising and lowering of the cultivator beams for shifting the clutch.

24. In combination, a frame having supporting wheels, operative mechanism mounted on said frame and movable relative to the axis of said supporting wheels as said mechanism is raised to inoperative position, means to raise and lower said mechanism, a clutch, a rotatable bracket on the operative mechanism for operating the clutch, and means actuated by the movement of the operative mechanism relative to said wheel axis for rocking the bracket when the operative mechanism is raised and lowered.

25. In combination, a supporting frame, supporting wheels journaled on said frame, an operating mechanism carried thereby and movable relative thereto, said mechanism including a rotatable shaft and a clutch for driving the same, and means for actuating the clutch including a member having a part movable about the axis of said shaft and a part movable about the axis of the supporting wheels.

26. In combination, a frame having supporting wheels, operative mechanism connected with said frame for movement relative to the wheel axes, means for effecting said movement, driving means for said mechanism including a shiftable part carried by said frame, and means for moving said shiftable part automatically upon said relative movement of the operative mechanism.

27. In combination, a supporting frame, an operating mechanism carried thereby and movable relative thereto, said mechanism including a rotatable shaft and a clutch for driving the same, means carried by said mechanism and pivoted thereto for movement coaxially with respect to said shaft for operating the clutch, and means including a link for connecting the first mentioned means with the frame whereby relative movement of the operating mechanism actuates the clutch.

28. In combination, a main frame, an operating mechanism having a frame, a rotatable shaft and a ground engaging member, said operating mechanism being movable relative to said main frame to and from operative position, driving connections for said shaft including a clutch, a member mounted on the main frame for movement about an axis thereon and a second member mounted for movement about the axis of the first named member and the axis of the shaft when the operating mechanism is moved relative to the frame, and means operated by the movement of the second member relative to the axis of the shaft for operating the clutch.

29. In combination, a frame having supporting wheels and fore and aft extending tool beams adapted to be raised and lowered, a soil engaging attachment having a rotatable mechanism removably secured to said beams and including a driving mechanism having a part removably secured to one of the supporting wheels, means for raising and lowering the tool beams, and means operated by the raising and lowering of the beams for interrupting and restoring operation of said driving mechanism.

30. In combination, a seed depositing mechanism including a rotatable shaft therefor, a frame for said seed mechanism, a main frame having an axle and supporting wheels journaled thereon, means connecting said frames together, a bracket journaled on said shaft, a link connecting one end of the bracket to the wheel axle, one of said wheels being provided with a sprocket, an eccentric adjustable bushing, a second sprocket member journaled at one end of said bracket on said eccentric adjustable bushing and being coincident with the axis of the connection between that end of the bracket and the link, a drive chain connecting said sprockets, said link being adjustable to tighten the chain, a third sprocket mounted on the shaft, and a chain trained over the third sprocket and second sprocket member, whereby adjustment of said eccentric bushing causes said second and third sprockets to move relative to each other and said first and second sprockets to move relative to each other.

31. In combination, a supporting frame, an operating mechanism including a shaft and connected with the frame, rotatable means on the frame for driving said mechanism, a bracket on the mechanism, a journal mounted on the bracket, rotatable means journaled on said bracket, driven rotatable means on said shaft, means connecting the driving rotatable means on the frame with the rotatable means on the bracket, a second means connecting the rotatable means on the bracket with the driven rotatable means on the shaft, and an eccentric means for tightening said two connecting means.

32. In combination, a frame, three rotatable means mounted thereon, one of said means constituting a driving means and a second of said means constituting a driven means, said three means being relatively arranged in substantially triangular formation and being mounted whereby one of said means is adapted to be movable relative to another, the third of said means being mounted on an axis normally fixed in radial relation with respect to said other two means, power transmitting means connecting said three means together, and eccentric means mounted on an axis coincident with the third of said rotatable means and rotatably movable for tightening or loosening the connection with the other two rotatable means.

33. In combination, a frame, three rotatable means mounted thereon, one of said means constituting a driving means and a second of said means constituting a driven means, said three means being relatively arranged in substantially triangular formation and being mounted whereby one of said means is adapted to be movable relative to another, the third of said means being mounted on an axis normally fixed in radial relation with said other two means, power transmitting means connecting said three means together, shiftable clutch means connected with one of said first two mentioned rotatable means, and means responsive to said relative movement for controlling said clutch means.

CARL G. STRANDLUND.